March 25, 1969     W. G. KINSLOW, JR     3,434,626

PLASTIC CONTAINER BOTTOM OF INCREASED STRENGTH

Filed Aug. 1, 1966

INVENTOR
W. G. KINSLOW, JR.

BY

ATTORNEYS

United States Patent Office 3,434,626
Patented Mar. 25, 1969

3,434,626
PLASTIC CONTAINER BOTTOM OF INCREASED STRENGTH
William G. Kinslow, Jr., Bartlesville, Okla., assignor to Phillips Petroleum Company, a corporation of Delaware
Filed Aug. 1, 1966, Ser. No. 569,321
Int. Cl. B65d 23/00, 25/00
U.S. Cl. 220—66                    4 Claims

ABSTRACT OF THE DISCLOSURE

Plastic containers having the bottom portions of improved structural stability are constructed such that the bottom wall projects upwardly and inwardly from the side wall toward the axis of the container to an annular shoulder substantially surrounding an axially downwardly-projecting portion of the bottom. The downwardly projecting portion is preferably the central portion of the container bottom and is preferably substantially symmetrically disposed about the central vertical axis.

---

This invention relates to a novel container bottom. In one aspect, the invention relates to strengthening the bottom of a bottle of any shape formed by pinching off a tubular plastic parison, and expanding said parison within a closed mold.

In another aspect, the invention relates to preventing flexure of the bottom of a container of any shape having an annular shoulder of unoriented plastic by providing a downwardly-projecting area surrounded by said shoulder. In another aspect, the invention relates to the distribution of internal pressures upon the bottom of a molded plastic bottle by forming a central, downwardly-projecting portion in the center of the bottom, thus relieving the pressure upon the annular shoulder of unoriented material surrounding said center portion.

BACKGROUND OF THE INVENTION

In the formation of containers by a blow-molding process, a parison of thermoplastic material is extruded, pinched off, and then expanded within a mold to form the container. Recent developments in the art have permitted orientation of the material forming the walls of the container, but the plastic at the pinch off point usually remains unoriented. Heretofore, most methods of pinching off a parison resulted in the formation of a container with an upwardly-projecting bottom. When a bottom of this shape is subjected to force caused by internal pressure, the bottom tends to flex and crack at the pinch off point.

It is an object of this invention to prevent cracking at that point. It is also an object of this invention to prevent flexure at that point. Another object of the invention is to form a downwardly-projecting portion at the center of the bottom of a container of any desired shape to prevent flexure of an annular shoulder of unoriented plastic substantially surrounding said portion.

Other aspects, objects and the several advantages of the invention will be apparent to one skilled in the art upon studying the drawings, specification and appended claims.

In accordance with the invention, a plastic container of any desired shape is formed with a bottom that projects upwardly and inwardly toward the axis from the plane of the base of the container to an annular shoulder which substantially surrounds a downwardly-projecting portion of the bottom. Improved bottom structure of this invention distributes internal pressures across the entire surface of the bottom, and the resultant forces exerted on the upwardly- and downwardly-projecting bottom areas effectively prevent flexure of the shoulder above these areas.

Referring now to the drawings.

Figure 1:
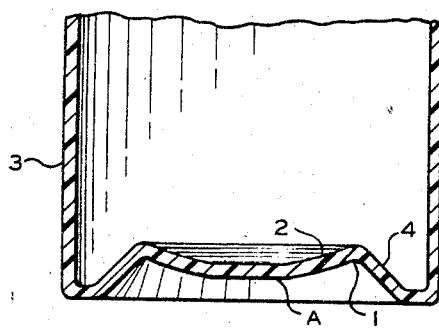
FIGURE 1 shows a cross-sectional side view of a substantially cylindrical container having the novel bottom structure of the invention.
Figure 4:
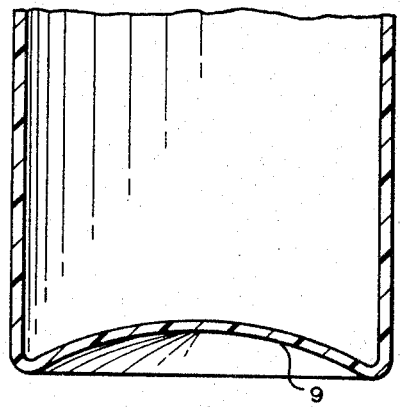
FIGURE 4 shows a cylindrical container having a conventionally shaped bottom.

As shown in FIGURE 1, bottom A of a substantially cylindrical container B slopes upwardly and inwardly toward the axis as at 4 to an annular shoulder of unoriented plastic 1 which surrounds the downwardly-projecting portion 2. The resultant force of internal pressure exerted upon the bottom is more uniformly distributed than the equivalent force would be upon bottom 9 of the substantially cylindrical container having a conventional upwardly-projecting bottom as shown in FIGURE 4.

Figure 2:
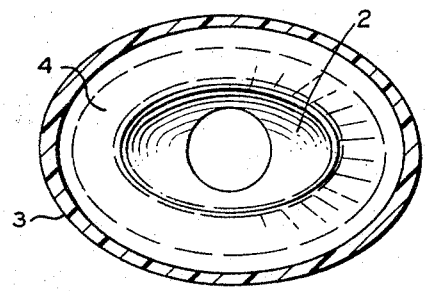
FIGURE 2 shows, in cross-section, a top view of the container pictured in FIGURE 1.
Figure 3:
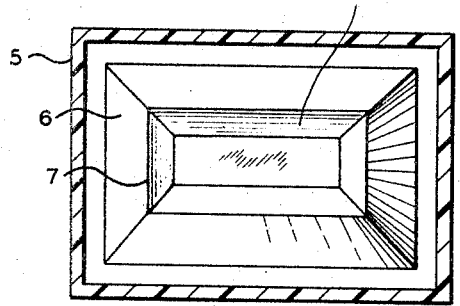
FIGURE 3 shows a top cross-sectional view of a rectangular shaped container having the novel bottom structure provided by the invention.

FIGURE 2, which is a top view of the container bottom pictured in FIGURE 1, and FIGURE 3, which is a top view of a container having an oblong bottom, show that the concept of the invention is applicable to a molded container of any shape. Thus, in FIGURE 3, wall 5 corresponds to wall 3 of FIGURE 1, upwardly and inwardly sloping portion 6 corresponds to portion 4 of FIGURE 1, shoulder 7 of FIGURE 3 corresponds to shoulder 1 of FIGURE 1, and downwardly projecting portion 2 of FIGURE 1 corresponds to downwardly projecting portion 8 of FIGURE 3.

The concept of the invention is applicable to the molding of round, oval, and polygonal containers having any number of sides. The bottom of the container and the annular shoulder formed therein can be of any shape, for example, round, oval or rectangular but the downwardly-projecting portion need not conform to the shape of the bottom. For example, as FIGURE 2 shows, the bottom can be oval, while the downwardly-projecting portion is circular in shape. Further, the bottom portion between the wall of the container and the inwardly-projecting portion of the bottom can be round or flat in the area which lies in the plane of the base. The wall (or walls) of the container can be at any angle with the plane of the base, or can be perpendicular thereto.

It will be apparent to one skilled in the art that the concept of this invention is applicable to the formation of plastic containers by any molding process which results in the formation of a similar area of weakness, in the bottom thereof. For example, a plastic container can be formed by vacuum molding or by blow molding a thermoplastic parison.

In practice, the concept of the invention is most effective when the amount of curvature of the downwardly projecting portion thereof is about equal to the curvature the bottle bottom can assume if fully distended by a distorting force.

It is within the scope of the invention to provide vacuum ports in the mold to allow vacuum to be drawn between the mold cavity and the outside of the parison in lieu of, or in addition to, forcing air into the inside of the parison. The main object is to introduce a differential pressure between the inside and outside of the parison to allow radial expansion during or after axial stretching.

A container having the improved bottom in accordance with the invention can be fabricated from any of the thermoplastic normally solid polymers and resins, such as the polyolefins, and especially high density polyethylene and polypropylene. In general, any solid polymer of an aliphatic mono-1-olefin can be used within the scope of this invention. Examples of such materials include polymers and copolymers of aliphatic mono-1-olefins, such as ethylene, propylene, butene-1, hexene-1, octene-1, and the like, and blends of these polymers and copolymers. Polymers of aliphatic mono-1-olefins having a maximum of 8 carbon atoms per molecule and no branching nearer the double bond than the fourth position provide thermoplastic containers having particularly desirable properties.

*Example*

Ten-ounce capacity round Boston bottles having about a 2⅜ inch outer diameter near the bottom, fabricated from oriented polypropylene resin and filled with about 60° F. tap water, were used in impact drop tests. Five of the bottles had a conventional bottom and the remainder had the bottom shape altered according to this invention as follows: The maximum diameter of the central downwardly projecting portion was 1⅛ inches. The exterior of the lowermost part of this section was 3/32 inch above a planar surface and the uppermost exterior portion of the central sections was 7/32 inch above a planar surface. The bottles were dropped from various heights ranging from five to twelve feet. Using the old style bottles, three failed (broke) at five feet, one failed at six feet, and the last one survived the maximum height. All the bottles with the altered bottom shape withstood the full twelve-foot drop without failure. Thus, a significant improvement in the impact resistance of bottles to the drop test was realized by altering the shape of the bottoms.

I claim:
1. A plastic container having a bottom projecting upwardly and axially inwardly from the plane of the base of said container to an annular shoulder surrounding a downwardly-projecting portion of said bottom wherein the downwardly-projecting portion of said bottom has an amount of curvature outward from the interior of said container about equal to the corresponding curvature said bottom can assume if fully distended.

2. A plastic container as defined in claim 1 wherein said container is a one-piece bottle having a round bottom, and said annular shoulder is substantially circular in shape.

3. A plastic container as defined in claim 1 wherein said container is made of a polyolefin.

4. A plastic container as defined in claim 3 wherein said polyolefin is selected from polyethylene and polypropylene.

References Cited

UNITED STATES PATENTS

| | | | |
|---|---|---|---|
| 2,431,537 | 11/1947 | Bogoslowsky | 220—66 X |
| 2,688,995 | 9/1954 | Wagoner | 215—1.5 |
| 2,790,994 | 5/1957 | Cardot et al. | 215—1.5 |
| 3,100,576 | 8/1963 | Frank | 215—1.5 |
| 3,156,279 | 11/1964 | Grebowiec et al. | 150—.5 |
| 3,237,910 | 3/1966 | Lavedas | 220—66 X |
| 3,312,262 | 4/1967 | Hunter | 150—.5 |

FOREIGN PATENTS 179,242   5/1962   Sweden.

JOSEPH R. LECLAIR, *Primary Examiner.*

JAMES R. GARRETT, *Assistant Examiner.*